US009736069B1

(12) United States Patent
Daniel et al.

(10) Patent No.: US 9,736,069 B1
(45) Date of Patent: Aug. 15, 2017

(54) METHOD FOR STORING AND RETRIEVING PACKETS IN HIGH BANDWIDTH AND LOW LATENCY PACKET PROCESSING DEVICES

(71) Applicant: Xpliant, Inc., San Jose, CA (US)

(72) Inventors: Tsahi Daniel, Palo Alto, CA (US); Enric Musoll, San Jose, CA (US); Dan Tu, San Bruno, CA (US)

(73) Assignee: Cavium, Inc., San Jose, CA (US)

( * ) Notice: Subject to any disclaimer, the term of this patent is extended or adjusted under 35 U.S.C. 154(b) by 182 days.

(21) Appl. No.: 14/142,653

(22) Filed: Dec. 27, 2013

Related U.S. Application Data

(60) Provisional application No. 61/873,294, filed on Sep. 3, 2013.

(51) Int. Cl.
*H04L 12/741* (2013.01)
*G06F 13/28* (2006.01)

(52) U.S. Cl.
CPC .............. *H04L 45/74* (2013.01); *G06F 13/28* (2013.01)

(58) Field of Classification Search
CPC .................................. H04L 45/74; G06F 13/28
USPC ........................................................ 370/392
See application file for complete search history.

(56) References Cited

U.S. PATENT DOCUMENTS

| | | | |
|---|---|---|---|
| 6,233,244 B1 * | 5/2001 | Runaldue ................. | G06F 5/06 370/412 |
| 7,668,103 B1 * | 2/2010 | Pannell .................... | H04L 47/10 370/235 |
| 2003/0058794 A1 * | 3/2003 | Pantelias ............. | H04L 12/2801 370/230 |
| 2004/0013124 A1 * | 1/2004 | Peebles ................... | H04L 47/10 370/412 |
| 2005/0117583 A1 * | 6/2005 | Uchida ............. | H04L 29/06027 370/395.4 |
| 2009/0074009 A1 * | 3/2009 | Kuliner ................... | H04L 69/22 370/474 |
| 2009/0109974 A1 * | 4/2009 | Shetty ................. | H04L 49/3009 370/392 |
| 2009/0304002 A1 * | 12/2009 | Yu et al. ..................... | 370/395.3 |
| 2011/0228931 A1 * | 9/2011 | Grube ................. | G06F 11/1076 380/201 |
| 2012/0011351 A1 * | 1/2012 | Mundra et al. .................. | 713/1 |

* cited by examiner

*Primary Examiner* — Mohammad Anwar
*Assistant Examiner* — Kokou R Detse
(74) *Attorney, Agent, or Firm* — Cooley LLP

(57) ABSTRACT

A packet processor includes a header processor and a packet memory. A receive direct memory access block is configured to receive a packet with a header and a payload and to route the header to the header processor and to route the payload to the packet memory such that the header processor begins processing of the header while the payload is loaded into packet memory.

10 Claims, 9 Drawing Sheets

_US 9,736,069 B1_

METHOD FOR STORING AND RETRIEVING PACKETS IN HIGH BANDWIDTH AND LOW LATENCY PACKET PROCESSING DEVICES

CROSS-REFERENCE TO RELATED APPLICATION

This application claims priority to U.S. Provisional Patent Application Ser. No. 61/873,294, filed Sep. 3, 2013, the contents of which are incorporated herein by reference.

FIELD OF THE INVENTION

This invention relate to processing packets in a computer network. More particularly, this invention relates to techniques for storing and retrieving packets in high bandwidth and low latency packet processing devices.

BACKGROUND OF THE INVENTION

FIG. 1 illustrates a prior art packet processor 100. The packet processor 100 includes a receive direct memory access (RDMA) 102 block. Direct memory access refers to a hardware subsystem that accesses system memory independently of a central processing unit. The RDMA 102 loads packets into packet memory (PM) 104. The RDMA 102 also passes a set of control information, referred to as a descriptor, to a header processor (HP). The descriptor is subsequently passed to a transmit queue (TQ) 108, which coordinates the transmittal of outgoing packets through a transmit direct memory access (TDMA) 110 block. The TDMA retrieves packets from PM 104.

The HP 106 makes decisions on what to do with the packet. Exemplary operations performed by the HP 106 include specifying an outgoing port to which a packet needs to be sent, whether a packet needs to be dropped, what modifications are needed on the packet, and whether the packet needs to be replicated. The HP 106 usually inspects and potentially modifies the first part of the packet (called the header) and does not inspect or modify the rest of the packet (called body or payload). The HP 106 usually accesses the PM 104 to read the header of the packet, and potentially writes it back modified. The processed header can have a different size than the original header (i.e., the processed header can grow or shrink in size).

The TQ 108 is a queuing system that makes decisions on when to send packets out, perform any replication of packets, respond to congestion by dropping packets, and guarantees per-flow ordering of packets.

The descriptor contains information about the packet. In particular, it contains a starting address in the PM where the packet resides. This information is generated by the RDMA (since this block stores the packet in the PM), and it is needed by the both the HP 106 (to know where the packet starts so the header can be read/written) and the TDMA 110 (so it can retrieve the packet from the PM and send it out). The HP 106 populates some information of the packet descriptor that the TQ 108 needs for its queuing decisions, and sends it to the TQ when the processing is completed. The TQ 108 sends the descriptor to the TDMA 110 after the packet is fully processed.

With the packet processor 100 of FIG. 1, the HP 106 cannot start processing the packet until the relevant portion of the packet (the header) is stored in the PM 104. The PM 104 could conservatively wait until the entire packet has been stored into the packet buffer or start processing the packet when a certain number of bytes have been stored. In either case, the HP 106 needs to wait until at least a portion of the header is stored in PM 104. This adds to the latency of the packet in the device, especially for short packets where most or the entire packet is a header.

In view of the foregoing, it would be desirable to provide a more efficient packet processor.

SUMMARY

A packet processor includes a header processor and a packet memory. A receive direct memory access block is configured to receive a packet with a header and a payload and to route the header to the header processor and to route the payload to the packet memory such that the header processor begins processing of the header while the payload is loaded into packet memory.

A method of processing network packets includes receiving a packet with a header and a payload. The header is routed to a header processor while the payload is routed to a packet memory. Processing of the header begins while the payload is loading into the packet memory.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1:
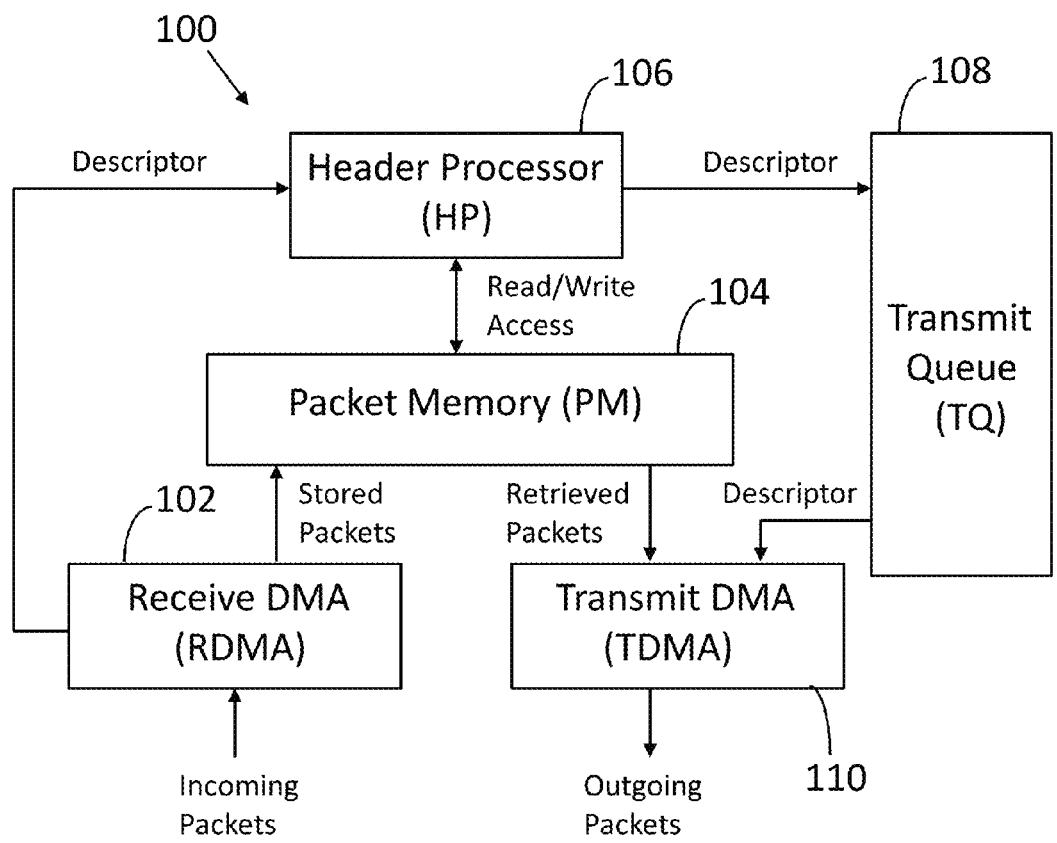
FIG. 1 illustrates a prior art packet processor.
Figure 2:
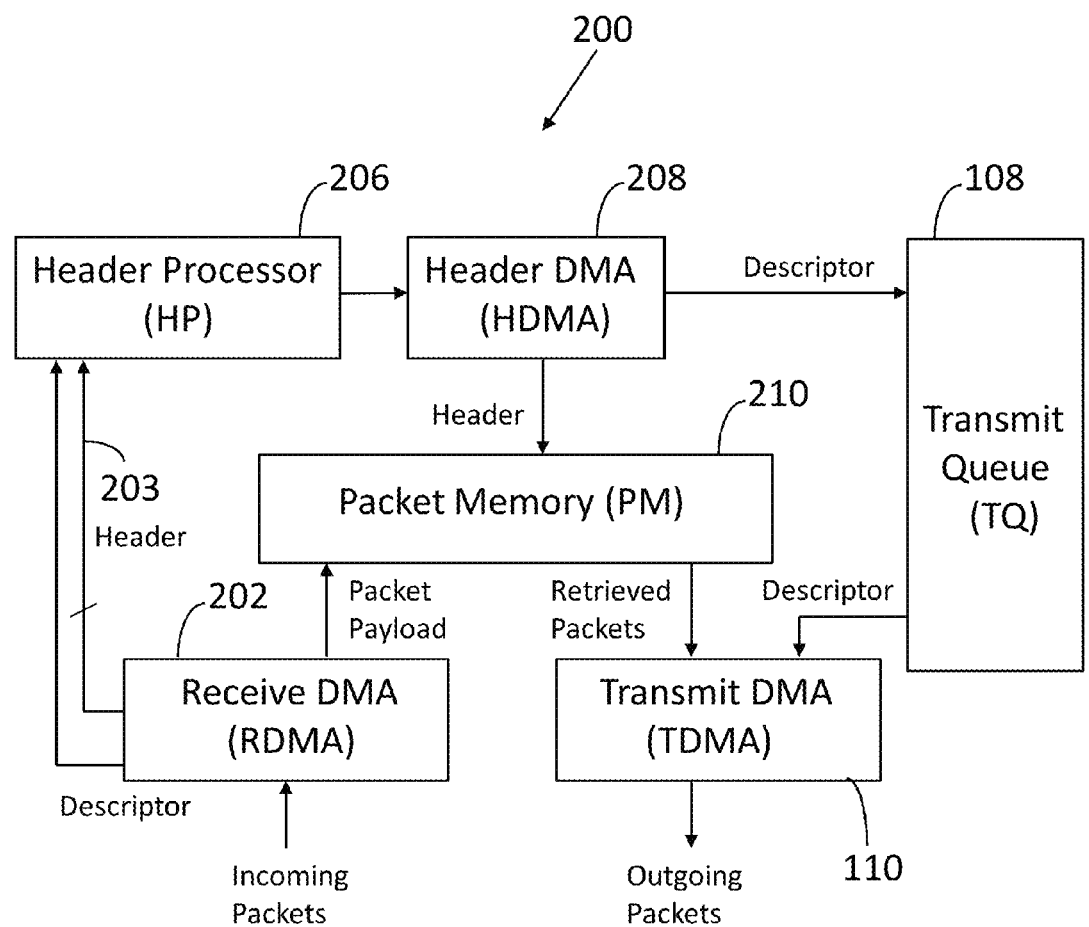
FIG. 2 illustrates a packet processor that eliminates the first write of the header into the PM by the RDMA in accordance with an embodiment of the invention.

FIG. 2 illustrates a packet processor 200 that reduces packet processing latency by sending the header (or a portion thereof) from the RDMA 202 directly to the HP 206 without storing it first. The header is transported on bus 203. The RDMA block 202 has two independent blocks. The first block is responsible for storing the body of the packet into the PM 210. The second block is responsible for sending the header of the packet to the HP 206 via bus 203.

In this new arrangement of blocks, the HP 206 is now "in-lined" with the flow of packet data. The RDMA 202 sends the header directly to the HP 206. The HP 206 processes the header and sends the new (potentially modified) header to a header direct memory access (HDMA) block 208, which stores the header into the PM 210. The latency of the packet is reduced because the processing can start as soon as the RDMA 202 provides the header to the HP 206, as opposed to waiting for the header to be written into and then read from the PM 210.

Note that in high-bandwidth packet processing devices, the individual words of data of the incoming packet can take several cycles to make their way into the PM 210. There are several reasons for this. First, there exists a high number of ports from which packets can simultaneously arrive at the device. Therefore, aggregation logic structures exist from the ports to the actual physical memories in the packet buffer, increasing the latency from the ports to these memories. Second, the PM 210 is a large memory structure, often broken down into several memories (called banks) to increase the data bandwidth. These memories occupy a large portion of the chip, thus adding extra cycles just to route the data to the proper memory.

Another mechanism to reduce the latency of packets in the device is to allow the HP 206 to start processing the header as soon as the first bytes of the header arrive. Several bytes usually arrive simultaneously. The number of bytes depends on the clock frequency and the port datapath width. Various implementation decisions are evaluated to meet the required per-port bandwidth.

Figure 3:
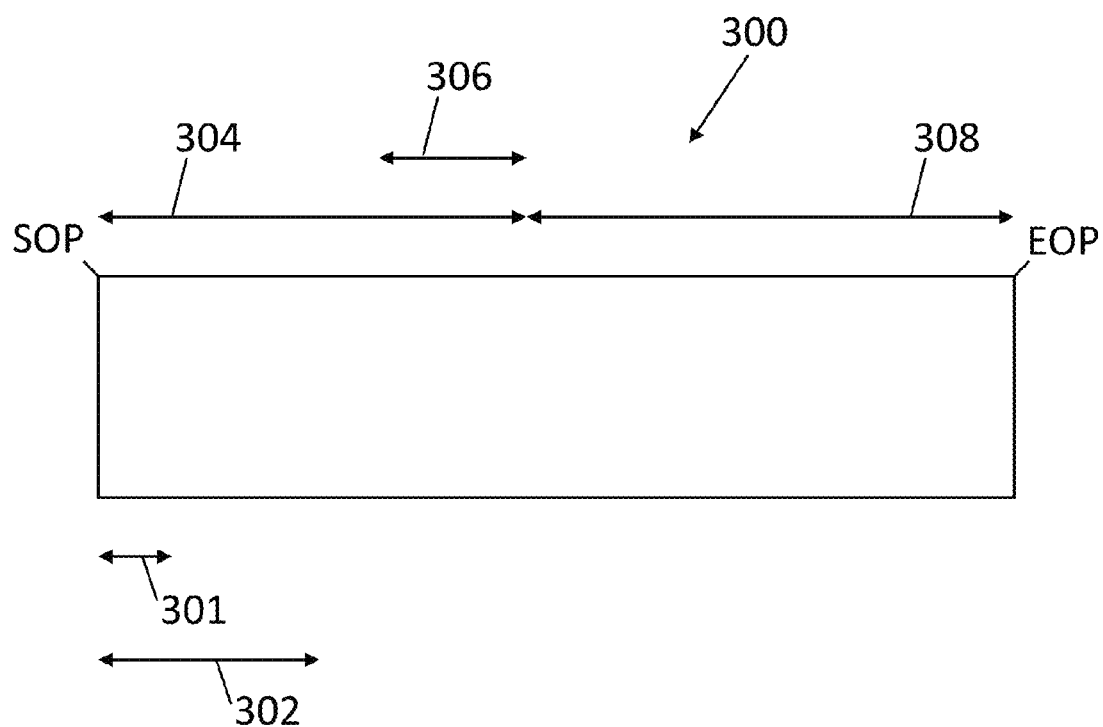
FIG. 3 illustrates packet attributes processed in accordance with an embodiment of the invention.

FIG. 3 illustrates a packet 300 with a typical port datapath width 301 and a DMA datapath width 302. As shown, the port datapath width 301 is usually smaller than the DMA datapath width 302, which is the minimum number of bytes that the RDMA accumulates from packets on a given port before making forward progress. Moreover, for ease of implementation, the DMA datapath width is a multiple of the port datapath width. Therefore, even if the RDMA receives a certain number of bytes, it will wait some cycles before a full DMA datapath width worth of bytes is sent to the HP 206.

Figure 4:
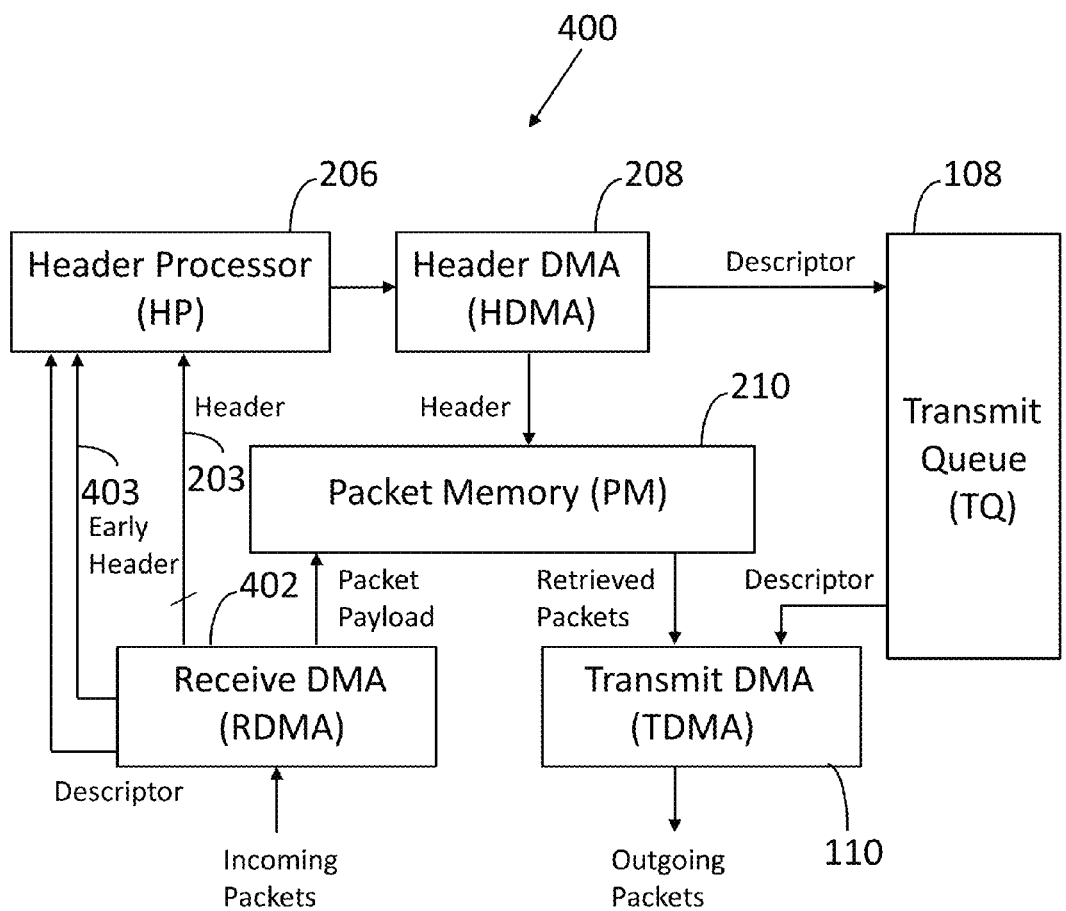
FIG. 4 illustrates a packet processor configured in accordance with an embodiment of the invention.

An embodiment of the invention utilizes an additional header interface (named "Early Header"). FIG. 4 illustrates a packet processor 400 with an Early Header interface 403 from RDMA 402 to HP 206. This interface is narrower than the header bus. For example, the Early Header size may correspond to the port datapath width 301, while the header bus size may correspond to the DMA datapath width 302.

The RDMA 402 sends the Early Header as soon as it gets the bytes from the ports, so the HP 206 can start the processing. The HP 206 can perform significant processing work with just the first bytes of a packet, even if those bytes do not constitute the full header.

At a later point, the RDMA 402 sends the full header (on the header interface 203), including the first bytes previously sent on the Early Header interface. This is because the packet data sent to the HP 206 on the header interface may have other metadata generated by the RDMA 402, such as the end-to-end error correcting code for protecting the data in the device. This information is not initially generated (and therefore is not provided) when the first bytes of the packet are forwarded to the HP 206. This information is not initially generated to reduce latency and because the end-to-end error correcting code is computed on the wider DMA Datapath Width.

The latency of the packet is reduced because the HP can start processing the packet while the rest of the header traverses the RDMA and eventually is sent to the HP. By the time the HP starts receiving the header data on the Header interface, a few cycles of computation have already occurred, effectively removing them from the latency that the packet experiences in the device.

Returning to FIG. 3, the packet 300 may include a configurable logical header length 304. The potential difference in header length between a pre-processed header and a post-processed header is shown with arrow 306. Region 308 represents the packet payload. An embodiment of the invention specifies how many bytes are sent to the HP 206 as part of the header. For ease of implementation, this number is a multiple of the DMA Datapath Width.

The logical header is configurable on a per port basis, so headers of different sizes are sent to the HP 206 depending on which port the packets come from. The processing of a packet may be different depending on which port it came from, so the per port configurability allows sending just enough header data to the HP 206 so that the HP 206 does not incur extra processing cycles sinking header data that is not needed.

The form of the pre-processed header is defined by the type of protocol. The header length is specified by the controlling protocol, but that length is not known until some or all of its fields are parsed by the HP 206. The RDMA 402 does not have the parsing capabilities to parse the header, so it sends the header to the HP 206, which is configured to be larger than any of the headers that can occur in the range of protocols supported by the device.

Figure 5:
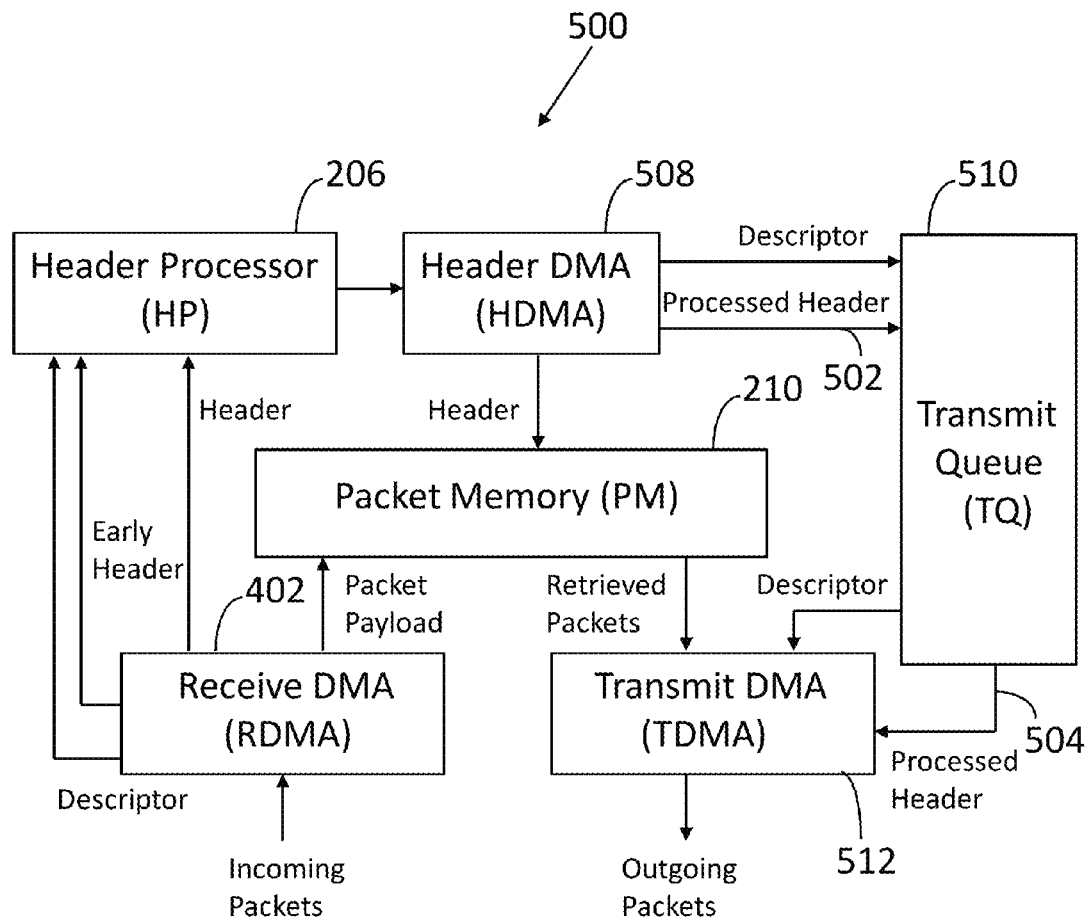
FIG. 5 illustrates a packet processor configured in accordance with another embodiment of the invention.

Another embodiment of the invention includes a mechanism in which retrieving the header from the PM 210 is not required under certain conditions. Such a packet processor 500 is shown in FIG. 5. When the TDMA 512 receives the packet descriptor from the TQ 510, in certain cases it can come with the processed header data, so this data is not required to be retrieved from the PM 210, thus reducing the latency of the packet. FIG. 5 shows a processed header on line 502 being passed to transmit queue 510. The TQ 510 applies the processed header the TDMA over line 504.

Because the header data is relatively wide, and the TQ 510 needs to queue the descriptors in storage structures to perform its functions, it is not reasonable to queue the header data as well due to the growth of storage space that the TQ 510 would require. Therefore, the header data is never queued in the TQ 510 and it is discarded if the descriptor needs to be queued. If the descriptor does not need to be queued (because the queues in the TQ 510 are empty or because the packet is tagged in the descriptor as a low-latency packet that can skip the queuing logic) the TQ 510 can forward the descriptor along with the header data to the TDMA 512.

Another condition where the header data is discarded by the TQ 510 is when the TDMA 512 flow controls the TQ 510 (for example, because the transmit ports are also flow controlling the TDMA 512). In this case, the TQ 510 needs to queue the descriptor so the corresponding header data is discarded.

In state of the art packet processing devices, the same packet may need to be transmitted to more than a single port. To reduce the latency of most of these packets, the transmit (tx) port field in the descriptor is replaced by a bit vector indicating which of the transmit ports the descriptor is intended for. Each position in the bit vector corresponds to a tx port number. When a bit in the bit vector is set, the corresponding tx port transmits a packet. That is, the transmit logic in the TDMA 512 associated with each tx port monitors the bit vector and processes the descriptor if the corresponding bit is set. With this optimization, the transmission of the same packet across several ports can occur as early as possible. Without the optimization, the TQ 510 would need to send the same descriptor as many times as packets need to be transmitted, each time changing the tx port field. Thus, this feature substitutes parallel packet processing for serial packet processing.

A common problem in high bandwidth packet processing devices is data under run. This occurs when the outgoing port is ready to accept the next data of the packet, but the device cannot provide that data (usually because the data has not been retrieved fast enough from the PM 210). Under run never occurs at the beginning of the packet; but once the beginning of the packet has been transmitted, then the device needs to match the speed of the port, otherwise the under run condition occurs. Packet under runs lead to dropped packets in the network and a loss of performance.

In state of the art devices, a FIFO usually sits between the logic that retrieves data from PM 210 and the ports, so that the transmission of data for each individual packet can be continuous at the port wire speed. Assuming that an average rate of data retrieval from the PM 210 is the same as the port speed, the FIFO can squash any cycle where data is not yet available but the port is ready to accept data from the packet that is currently being transmitted. This FIFO mechanism is shown in FIG. 6.

Figure 6:
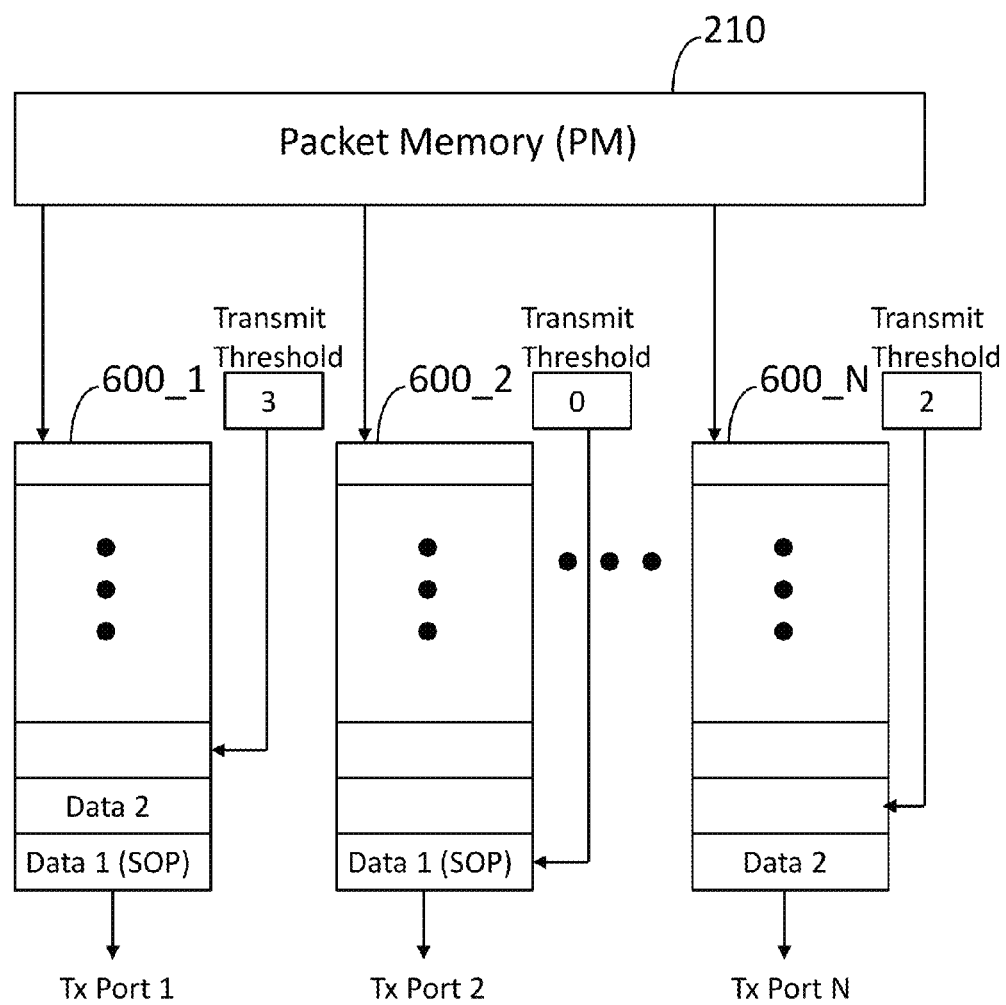
FIG. 6 illustrates a FIFO configuration utilized in accordance with an embodiment of the invention.

FIG. 6 illustrates PM 210 and a set of transmit queues 600_1 through 600_N. Each transmit queue has an associated transmit threshold, for example specifying a slot position as the threshold. In this example, queue 600_1 has a transmit threshold of 3, queue 600_2 has a transmit threshold of 0 and queue 600_N has a transmit threshold of 2. The FIFO mechanism alleviates the under run condition. Depending on the size of the FIFO, the rate of data retrieval from memory versus the port speed, and the particulars of the implementation of the PM 210 subsystem (e.g., how many banks, contention resolution to the banks, latency to the PM, etc.), there can still be cycles where the FIFO is empty and the port is ready to accept data from the packet that is currently being transmitted, leading to an under run event.

To reduce under run events, a programmable threshold is used at each FIFO. When the data to be transmitted to the port corresponds to the beginning of the packet, the data is not sent to the port until there is enough data in the FIFO from that packet, i.e. until the amount of data accumulated reaches the value set in the configurable threshold. When data of the packet has already been sent to the port, the threshold is no longer considered (i.e., data is sent to the port whenever the port requests for it).

The configurable threshold is helpful when the ports can be configured with different speeds. A lower threshold implies a lower latency of the packet, but it also increases the potential for under runs.

Queue 600_1 has a transmit threshold of 3. The Figure shows that the data for the beginning of the packet (Start of Packet or SOP) has been retrieved from PM 210 and is in the FIFO, but it will not be sent out until additional data is retrieved. At that point, the data threshold is met and data can be sent to the port.

For queue 600_2 the threshold is set at 0 (i.e., there is no threshold). Therefore, any data retrieved from PM 210 can be sent right away (if the port requests for it), regardless of whether it corresponds to the beginning of the packet or not. For queue 600_N, the threshold is set at 2. Queue 600_N shows that the oldest data in the FIFO corresponds to data that is not the beginning of the packet, so this data can be sent right away to the port (if the port requests for it) even though the data threshold is not met.

Figure 7:
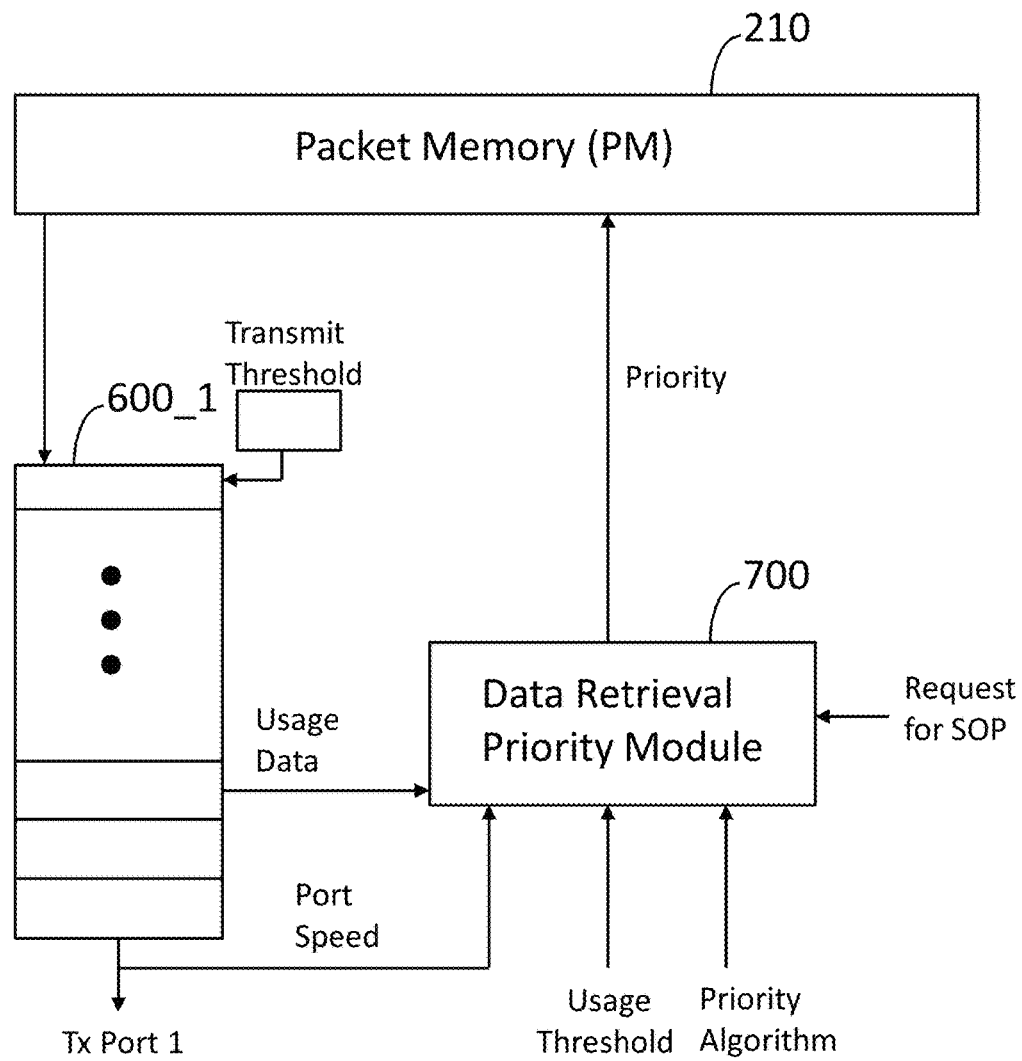
FIG. 7 illustrates a data retrieval priority mechanism utilized in accordance with an embodiment of the invention.

To further mitigate under run events, it is desirable that more bandwidth is assigned to transmit ports with transmit FIFOs running low on data. FIG. 7 shows a device to achieve this functionality. A data retrieval priority module 700 may be a hardwired or software implemented module to supply priority values to PM 210. The priority values may be based upon a variety of factors, such as usage data associated with a queue 600_1, port speed, a FIFO usage threshold, a specified priority algorithm and a request for a SOP, which operate as inputs to the data retrieval priority module 700.

Figure 8:
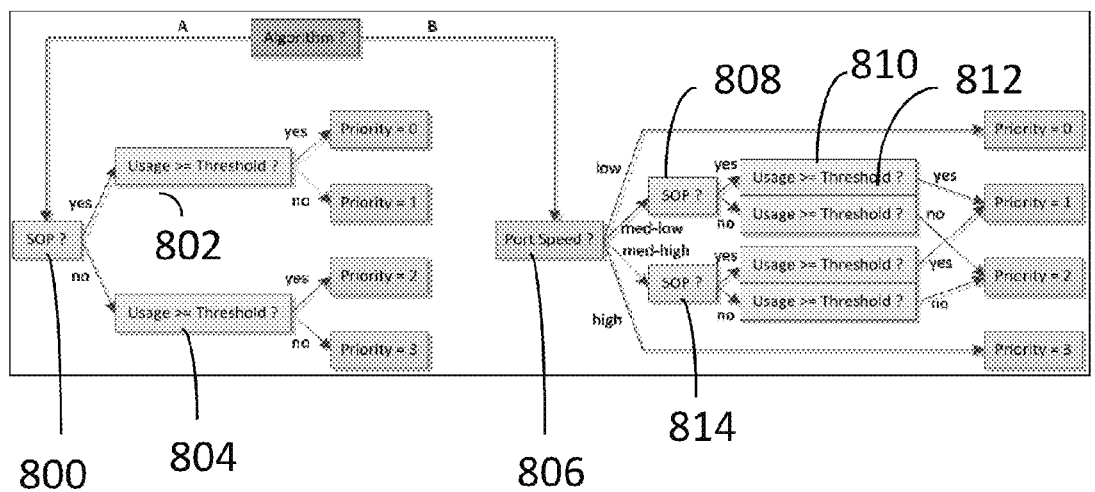
FIG. 8 illustrates an exemplary priority assignment scheme utilized in accordance with an embodiment of the invention.

Several algorithms can be devised to determine the priority. The algorithm depends on several aspects, like the speed of the port and the implementation details of the PM 210. For a priority field of n=2 bits, FIG. 8 shows two such algorithms. The first algorithm (A) does not take into account the speed of the port. Instead, a start of packet condition is tested at block 800. If a start of packet condition exists, a usage threshold is checked at block 802 and priorities are assigned. The second algorithm (B) gives more weight to the speed of the port than to the SOP. The port speed is checked at block 806. A low port speed results in a start of packet check at block 808. An existing SOP results in a usage threshold check at block 810, while a non-existent SOP results in a usage threshold check at block 812, resulting in different assigned priorities. Similar processing transpires for a high port speed, with a SOP evaluation at block 814. Naturally, other algorithms with different weights to the inputs and with more than 4 levels of priority can be devised.

An embodiment of the invention has multi-port virtual transmit FIFO management. In high bandwidth packet processing devices the ports can be configured to accept more than one packet in an interleaved way. From the Transmit FIFO perspective, several independent ports need to be served. The physical FIFO then becomes a virtual multi-FIFO since packet data can be read in a different order than it came in. By implementing a shared transmit FIFO across a set of ports rather than physically splitting the transmit FIFO into several smaller per-port transmit FIFOs, an individual port can use up to the full transmit FIFO storage when the other ports are idle, thus utilizing the storage space more efficiently. One clear example of this advantage is when the ports can be configured in, for example, a set of S independent ports of P bandwidth each, or a single port of S*P bandwidth. Both cases lead to the same packet bandwidth, but in the second case S−1 ports are idle, and the single enabled port can then take advantage of the full transmit FIFO.

Depending on the implementation of the PM 210, data for the same packet can come from the PM 210 in a different order than it was requested. This is another reason why data may be read out in a different order than it was written. The highly banked nature of PM 210 in high-bandwidth packet processing devices leads to frequent out-of-order data events that need to be resolved (i.e., put back in order) in the transmit FIFO.

Figure 9:
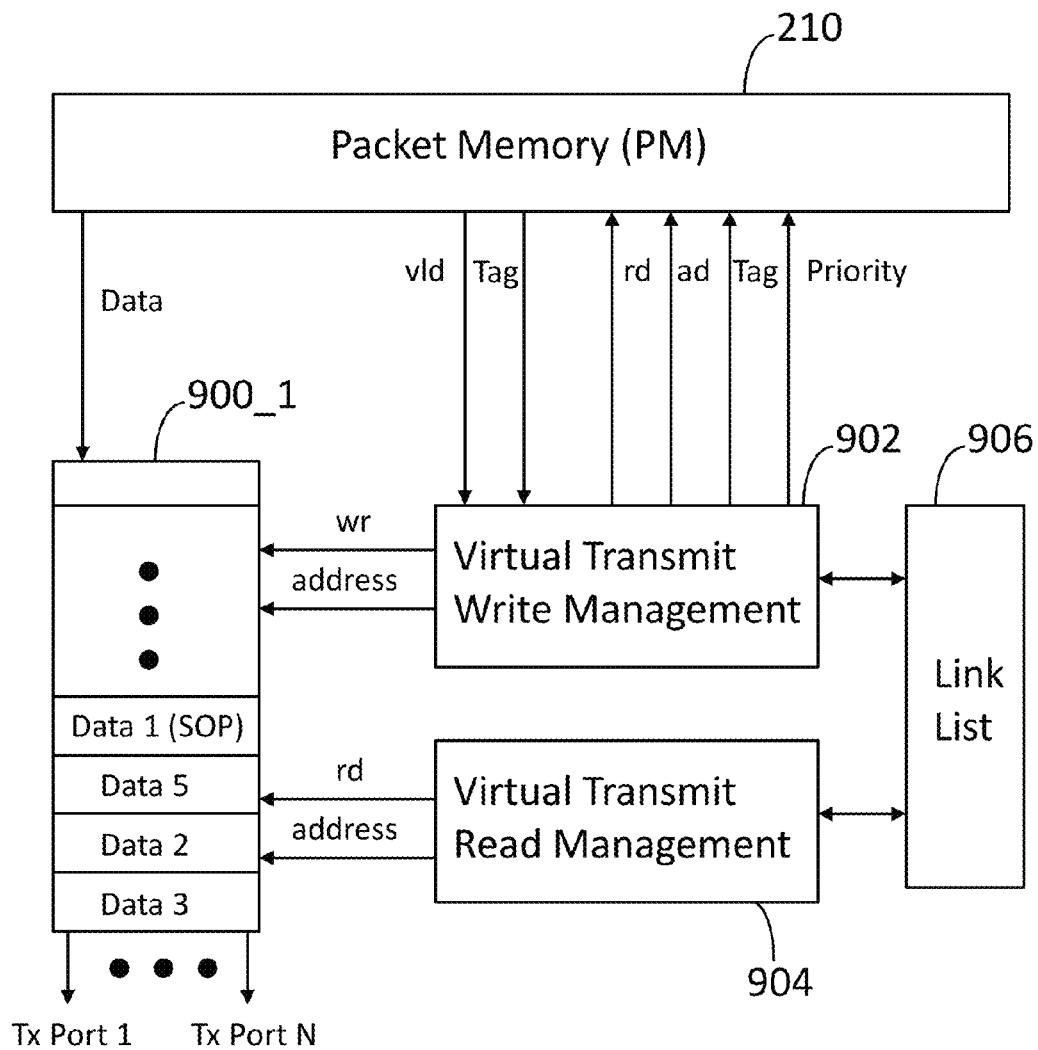
FIG. 9 illustrates virtualized FIFO transmission port utilized in accordance with an embodiment of the invention.

FIG. 9 illustrates a multi-port virtual transmit FIFO 900_1. A virtual transmit write management module 902 communicates with PM 210 and a link list module 906. The virtual transmit write management module 902 applies read, address, tag and priority signals to PM 210. The PM 210 supplies a valid signal and a tag signal to the virtual transmit write management module 902 and the data to the virtual FIFO 900_1. The virtual transmit write management module 902 applies a write strobe and an address to memory 900_1. Similarly, a virtual transmit read management module 904 communicates with the link list module 906 and applies a read strobe and address to memory 900_1.

The virtual transmit write management module 902 decides for which of the S ports it will request the next packet data. This block implements the data retrieving priority technique described above. This block also issues the read commands to the PM 210, along with the corresponding address and a tag that is used to associate the data coming back from the PM 210 to the port to where the packet data needs to be transmitted. Before issuing the read requests to the PM 210, this block allocates entries in the transmit FIFO, and links them on a per-port basis in the link list module 906. When data is received from the PM 210, this block updates the state of the entries in the link list module 906.

The virtual transmit read management module decides when the data that resides in the transmit FIFO can be sent to the ports. The data is sent to a particular port if the port requests the data and the next data (in packet order) is available in the FIFO. This block traverses the per-port link list of entries in the transmit FIFO to send each packet out. If the data in the entry is not valid, the transmission halts until that data has arrived to the transmit FIFO. Once data is sent to the port, its entry in the FIFO is released and can be used again by the virtual transmit write management block 902. If more than a port is ready to accept data and the transmit FIFO has available data, the virtual transmit read management block 904 can either issue more than a read request to the transmit FIFO (assuming the FIFO is multi-ported), or it needs to decide on a port and then issue the read request to the transmit FIFO. If the speed of the ports is different, the virtual transmit read management block 904 may implement a priority round-robin scheme, otherwise a simple round-robin scheme may suffice.

The link list module 906 maintains the per-port link list of transmit FIFO entries. At any given time, a per-port list links the entries in the FIFO that have been allocated for that port and either contain already valid data or the data is still pending to be received.

Thus, this disclosure presents a packet processor that can start processing packets as soon as a fragment of a header is available (and before a packet is stored in the device's packet buffer). The retrieval of packets can start, in some cases, as soon as the packet has been processed (without the need to retrieve the header from the packet buffer), thus minimizing the latency of the packet in the device.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A packet processor, comprising:
a packet memory;
a header processor to process a header and send a modified header to a header direct memory access block that stores the modified header in the packet memory without modification or augmentation of the modified header; and
a receive direct memory access block configured to receive a packet with the header and a payload and to route the header to the header processor prior to storage in the packet memory and to route the payload to the packet memory such that the header processor begins processing of the header while the payload is loaded into packet memory, wherein the receive direct memory access block includes a header segment port to convey a segment of the header to the header processor prior to receiving the complete header.

2. The packet processor of claim 1 further comprising a plurality of transmission queues coupled to the packet memory, wherein each transmission queue has a configurable transmission threshold.

3. The packet processor of claim 2 further comprising a data retrieval priority module to dynamically allocate packet memory bandwidth to the plurality of transmission queues.

4. The packet processor of claim 3 wherein the data retrieval priority module establishes priority values based upon a plurality of input parameters.

5. The packet processor of claim 4 wherein the plurality of input parameters are selected from usage data, port speed, usage threshold and a start of packet request.

6. A packet processor, comprising:
a packet memory;
a header processor to process a header and send a modified header to a header direct memory access block that stores the modified header in the packet memory without modification or augmentation of the modified header, wherein the header direct memory access block is configured to route a processed header to a transmit queue; and
a receive direct memory access block configured to receive a packet with the header and a payload and to route the header to the header processor prior to storage in the packet memory and to route the payload to the packet memory such that the header processor begins processing of the header while the payload is loaded into packet memory.

7. The packet processor of claim 6 wherein the transmit queue is configured to process the processed header to coordinate the transmission of a packet without access to the packet memory.

8. The packet processor of claim 6 wherein the transmit queue is configured to generate a bit vector specifying port numbers that need to transmit the packet.

9. A packet processor, comprising:
- a packet memory;
- a header processor to process a header and send a modified header to a header direct memory access block that stores the modified header in the packet memory without modification or augmentation of the modified header;
- a receive direct memory access block configured to receive a packet with the header and a payload and to route the header to the header processor prior to storage in the packet memory and to route the payload to the packet memory such that the header processor begins processing of the header while the payload is loaded into packet memory; and
- a virtual transmit write management module connected to the packet memory, the transmit memory and a link list module;
- wherein the packet memory is coupled to a transmit memory configured as a virtual transmit memory with out-of-order data for multiple physical ports.

10. The packet processor of claim 9 further comprising a virtual transmit read management module connected to the packet memory, the transmit memory and a link list module.

* * * * *